US008601137B2

(12) United States Patent
Kong et al.

(10) Patent No.: US 8,601,137 B2
(45) Date of Patent: Dec. 3, 2013

(54) METHOD OF CREATING AND MANAGING SESSION BETWEEN WIRELESS UNIVERSAL SERIAL BUS HOST AND WIRELESS UNIVERSAL SERIAL BUS DEVICE AND PROVIDING WIRELESS UNIVERSAL SERIAL BUS HOST AND WIRELESS UNIVERSAL SERIAL BUS DEVICE

(75) Inventors: Ji-young Kong, Suwon-si (KR); Kyung-wook Ye, Seoul (KR); Jong-woo Chae, Suwon-si (KR); Min-soo Kim, Seoul (KR); Hyeong-seok Kim, Seongnam-si (KR); Jung-wook Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 527 days.

(21) Appl. No.: 11/949,910

(22) Filed: Dec. 4, 2007

(65) Prior Publication Data

US 2008/0162742 A1     Jul. 3, 2008

(30) Foreign Application Priority Data

Dec. 28, 2006  (KR) .......................... 10-2006-136802

(51) Int. Cl.
*G06F 15/16* (2006.01)
*G06F 15/173* (2006.01)

(52) U.S. Cl.
USPC ............ 709/228; 709/227; 709/223; 709/224

(58) Field of Classification Search
USPC .................................. 709/227, 228, 223, 224
See application file for complete search history.

(56) References Cited

U.S. PATENT DOCUMENTS

| 5,027,269 | A  | * | 6/1991  | Grant et al. ................... 709/224 |
| 5,751,719 | A  | * | 5/1998  | Chen et al. ................... 370/473 |
| 6,477,373 | B1 | * | 11/2002 | Rappaport et al. ............ 455/436 |
| 6,603,744 | B2 | * | 8/2003  | Mizutani et al. .............. 370/310 |
| 6,721,290 | B1 | * | 4/2004  | Kondylis et al. .............. 370/329 |
| 7,140,549 | B2 | * | 11/2006 | de Jong ........................ 235/492 |
| 7,184,707 | B2 | * | 2/2007  | Tada et al. .................... 455/41.3 |

(Continued)

FOREIGN PATENT DOCUMENTS

| JP | 2002-27019    |   | 1/2002 |
| JP | 2002-152309   |   | 5/2002 |
| KR | 2001-0042902  | A | 5/2001 |

OTHER PUBLICATIONS

Japanese Office Action issued on Sep. 21, 2010, in corresponding Japanese Patent Application No. 2007-323740 (3 pages).

(Continued)

*Primary Examiner* — Hieu Hoang
(74) *Attorney, Agent, or Firm* — NSIP Law (57) ABSTRACT

Provided is a session management method of managing a session created between a wireless universal serial bus (USB) host and a wireless USB device through a wireless network, the session management method including: receiving session status messages periodically transmitted for checking a status of the created session; counting a number of continuous reception failures representing a number of the session status messages that are not received; and if the number of the continuous reception failures of session status messages is greater than a reference number, changing the current status of the session to a suspended status if the current status of the session is a connected status, and closing the created session if the current status of the session is a suspended status.

39 Claims, 9 Drawing Sheets

(56) References Cited

U.S. PATENT DOCUMENTS

| | | | |
|---|---|---|---|
| 7,334,072 B1* | 2/2008 | Wright | 710/315 |
| 2002/0032751 A1* | 3/2002 | Bharadwaj | 709/218 |
| 2004/0024918 A1* | 2/2004 | Skidmore et al. | 710/1 |
| 2004/0027998 A1* | 2/2004 | Palm | 370/276 |
| 2004/0068572 A1* | 4/2004 | Wu | 709/229 |
| 2004/0192221 A1* | 9/2004 | Matsunaga | 455/76 |
| 2004/0246909 A1 | 12/2004 | Ahn | |
| 2005/0159138 A1* | 7/2005 | Florkey et al. | 455/414.1 |
| 2005/0262241 A1* | 11/2005 | Gubbi et al. | 709/225 |
| 2006/0012312 A1 | 1/2006 | Lyle, Jr. et al. | |
| 2006/0025181 A1* | 2/2006 | Kalofonos et al. | 455/574 |
| 2006/0123166 A1 | 6/2006 | Toebes et al. | |
| 2006/0184535 A1* | 8/2006 | Kaluskar et al. | 707/10 |
| 2006/0240771 A1* | 10/2006 | Graves et al. | 455/39 |
| 2007/0035276 A1* | 2/2007 | Webjorn | 320/114 |
| 2007/0130305 A1* | 6/2007 | Piper et al. | 709/223 |
| 2007/0190963 A1* | 8/2007 | Ananthanarayanan et al. | 455/343.1 |
| 2007/0232357 A1* | 10/2007 | Takasu | 455/558 |
| 2007/0254709 A1* | 11/2007 | Higgins | 455/557 |
| 2008/0003556 A1* | 1/2008 | Takahashi et al. | 434/307 R |
| 2008/0065916 A1* | 3/2008 | Liu et al. | 713/320 |
| 2009/0037998 A1* | 2/2009 | Adhya et al. | 726/11 |
| 2009/0077184 A1* | 3/2009 | Brewer et al. | 709/206 |
| 2009/0164611 A1* | 6/2009 | Corda et al. | 709/222 |

OTHER PUBLICATIONS

Chinese Office Action issued on Apr. 29, 2010, in corresponding Chinese Application No. 200710152424.X (6 pages).

Intel, "Wireless USB—The First High-speed Personal Wireless Interconnect," *Intel White Paper*, Feb. 17, 2004 (8 pages).

"Wireless Universal Serial Bus Specification, Revision 1.0," May 12, 2005, USB Implementers Forum (303 pages), in particular see pp. 1, 2, 11-14, and 76-84.

Partial European Search Report issued on Jul. 25, 2011, in counterpart European Patent Application No. 07116984.1 (6 pages, in English).

Extended European Search Report issued on Dec. 8, 2011, in counterpart European Patent Application No. 07116984.1 (10 pages, in English).

* cited by examiner

| SESSION ID | DEVICE ADDRESS | STATUS |
|---|---|---|
| 1 | 169.254.1.1 | CONNECTED |
| 2 | 169.254.20.54 | CONNECTED |
| 3 | 169.254.100.88 | SUSPENDED |

METHOD OF CREATING AND MANAGING SESSION BETWEEN WIRELESS UNIVERSAL SERIAL BUS HOST AND WIRELESS UNIVERSAL SERIAL BUS DEVICE AND PROVIDING WIRELESS UNIVERSAL SERIAL BUS HOST AND WIRELESS UNIVERSAL SERIAL BUS DEVICE

CROSS-REFERENCE TO RELATED APPLICATION

This application claims all benefits accruing under 35 U.S.C. §119 from Korean Patent Application No. 2006-136802 filed on Dec. 28, 2006, in the Korean Intellectual Property Office, the disclosure of which is incorporated herein by reference.

BACKGROUND OF THE INVENTION

1. Field of the Invention

Aspects of the present invention relate to a method of creating and managing a session between a wireless universal serial bus (USB) host and a wireless USB device, and provide the wireless USB host and the wireless USB device.

2. Description of the Related Art

Conventionally, a wireless universal serial bus (USB) technology is referred to as a certified wireless USB (CWUSB). An operation of connecting a wireless USB host and a wireless USB device generally includes a certification operation, a reconnection operation, a connection close operation, and a sleep/wakeup operation for power management.

The CWUSB uses an ultra-wideband physical layer (UWB PHY) and is based on a time division multiple access (TDMA). Accordingly, a time scheduling by the wireless USB host is needed such that the wireless USB device can transmit data to the wireless USB host in an allocated time slot. An adaptability of the CWUSB is reduced when dependent on a single wireless technology since mobile devices that apply the wireless USB technology use various wired/wireless networking technologies.

Moreover, a session connection operation in a session management method of the CWUSB is only started by the wireless USB device. In this case, a usage scenario that can be used by a practical user and the conditions of the wireless USB device that can apply to the CWUSB may be limited. For example, when a single wireless USB device must select a single conceptual association from among several possible conceptual associations, the single wireless USB device displays the conceptual associations and requires a navigation button to select the single conceptual association. However, not all devices employing the wireless USB technology have the navigation button. Therefore, in this case, the role of the wireless USB device must be minimized, while most of the roles must be performed by the wireless USB host.

Furthermore, when the wireless USB device transmits a connection request and the wireless USB host does not respond thereto, the wireless USB device must retransmit the connection request. Unlike a USB connection in a wired method where power is supplied from the wireless USB host, the wireless USB device using the CWUSB must include a power supply (such as a battery). Therefore, the operation of retransmitting the connection request increases the battery consumption of the wireless USB device.

Finally, when a momentary loss of connection occurs due to wireless network characteristics, a reconnection operation must be performed. As a result, the load on the wireless USB device may be increased. Moreover, an operation of recognizing the wireless USB device by an operating system has to be performed for every reconnection operation, thereby causing inconvenience to the user.

SUMMARY OF THE INVENTION

Aspects of the present invention provide a method of creating and managing a session between a wireless universal serial bus (USB) host and a wireless USB device, and provide the wireless USB host and the wireless USB device so that a session is created and managed by the wireless USB host, and thus decreasing battery consumption of the wireless USB device and solving the inconvenience to a user of frequent disconnections.

Additional aspects and/or advantages of the invention will be set forth in part in the description which follows and, in part, will be obvious from the description, or may be learned by practice of the invention.

In accordance with an example embodiment of the present invention, there is provided a session management method of managing a session created between a wireless USB host and a wireless USB device through a wireless network. Such a session management method comprises: receiving session status messages periodically to check a status of the created session; counting a number of continuous reception failures corresponding to a number of session status messages that are not received; changing a current status of the session from a connected status to a suspended status if the current status of the session is the connected status; and closing the created session if the current status of the session is the suspended status and the number of the continuous reception failures is greater than a second predetermined reference number.

According to an aspect of the present invention, there is provided a computer-readable medium having embodied thereon a computer program for executing the method.

In accordance with another example embodiment of the present invention, there is provided a wireless USB host for managing a session created with a wireless USB device through a wireless network. Such a wireless USB host comprises: a message generating unit to generate a session status message for checking a status of the created session; a wireless transceiving unit to periodically transmit the generated session status message to the wireless USB device and to receive a session status message from the wireless USB device; a counter to count a number of continuous reception failures corresponding to a number of the session status messages that are not received from the wireless USB device; and a session creation management unit to change a current status of the session from a connected status to a suspended status if the current status of the session is the connected status and the number of the continuous reception failures is greater than a predetermined reference number, and to close the created session if the current status is the suspended status and the number of the continuous reception failures is greater than a second predetermined reference number.

In accordance with yet another example embodiment of the present invention, there is provided a session creation method of creating a session between a wireless USB host and a wireless USB device having wireless IP addresses, respectively, through a wireless network and performed by the wireless USB host. Such a session creation method comprises: retrieving characteristic information including the IP address of the retrieved wireless USB device; transmitting a session creation request message requesting a creation of a session from the wireless USB host to the wireless USB device; transmitting a session creation response message, in response to the session creation request message, from the wireless USB device to the wireless USB host; allocating a session ID to the wireless USB device in response to the session creation response message; transmitting a session creation acknowledgement message including the allocated session ID from the wireless USB host to the wireless USB device; and generating a session between the wireless USB host and the wireless USB device by using the session ID and the IP address of the wireless USB device and the IP address of the wireless USB host.

According to another aspect of the present invention, there is provided a computer-readable medium having embodied thereon a computer program for executing the method.

In accordance with yet another example embodiment of the present invention, there is provided a wireless USB device for creating a session with a wireless USB host having an IP address through a wireless network. Such a wireless USB device comprises: a message generating unit generating a session creation response message in response to a session creation request message received from the wireless USB host; a wireless transceiving unit receiving the session creation request message including the IP address of the wireless USB host and a session creation acknowledgement message including a session ID allocated to the wireless USB device through the wireless network and transmitting characteristic information including an IP address of the wireless USB device in response to a received request of the wireless USB host; and a session creating unit creating a session with the wireless USB host by using the received session ID and the IP address of the wireless USB host.

In accordance with still another example embodiment of the present invention, there is provided a wireless USB host for creating a session with a wireless USB device having an IP address through a wireless network. Such a wireless USB host comprises: a retrieving unit retrieving the wireless USB device connected to the wireless network and acquiring characteristic information including an IP address of the retrieved wireless USB device; a message generating unit generating a session creation request message requesting a creation of a session and a session creation acknowledgement message including a session ID allocated to the wireless USB device; a wireless transceiving unit transmitting the generated session creation request message and the session creation acknowledgement message through the wireless network and receiving a session creation response message in response to the session creation request message; a session ID allocating unit allocating the session ID to the wireless USB device in response to the session creation response message; and a session creating unit creating the session with the wireless USB device by using the session ID and the IP address of the wireless USB device.

In accordance with another example embodiment of the present invention, there is provided a wireless USB device for managing a session created with a wireless USB host through a wireless network. Such a wireless USB device comprises: a wireless transceiving unit to receive a session status message, periodically transmitted from the wireless USB host, indicating a status of the session; a counter to count a number of continuous reception failures corresponding to a number of the session stat messages that are not received from the wireless USB host; and a session creation management unit to change a current status of the session from a connected status to a suspended status if the current status of the session is the connected status and the number of the continuous reception failures is greater than a first predetermined reference number, and to close the created session if the current status is the suspended status and the number of the continuous reception failures is greater than a second predetermined reference number.

In accordance with yet another example embodiment of the present invention, there is provided a wireless USB host for managing a session created with a wireless USB device through a wireless network. Such a wireless USB device comprises: a wireless transceiving unit to receive a session status message, periodically transmitted from the wireless USB device, indicating a status of the session; a counter to count a number of continuous reception failures corresponding to a number of the session stat messages that are not received from the wireless USB device; and a session creation management unit to change a current status of the session from a connected status to a suspended status if the current status of the session is the connected status and the number of the continuous reception failures is greater than a first predetermined reference number, and to close the created session if the current status is the suspended status and the number of the continuous reception failures is greater than a second predetermined reference number.

In accordance with still another example embodiment of the present invention, there is provided a session creation method of creating a session between a wireless USB host and a wireless USB device having wireless IP addresses, respectively, through a wireless network and performed by the wireless USB device. Such a session creation method comprises: transmitting a session creation request message requesting a creation of a session from the wireless USB device to the wireless USB host; receiving a session creation response message, in response to the session creation request message, from the wireless USB host, the session creation response message including a session ID; and generating a session between the wireless USB host and the wireless USB device by transmitting a data connection request from the wireless USB device to the wireless USB host.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
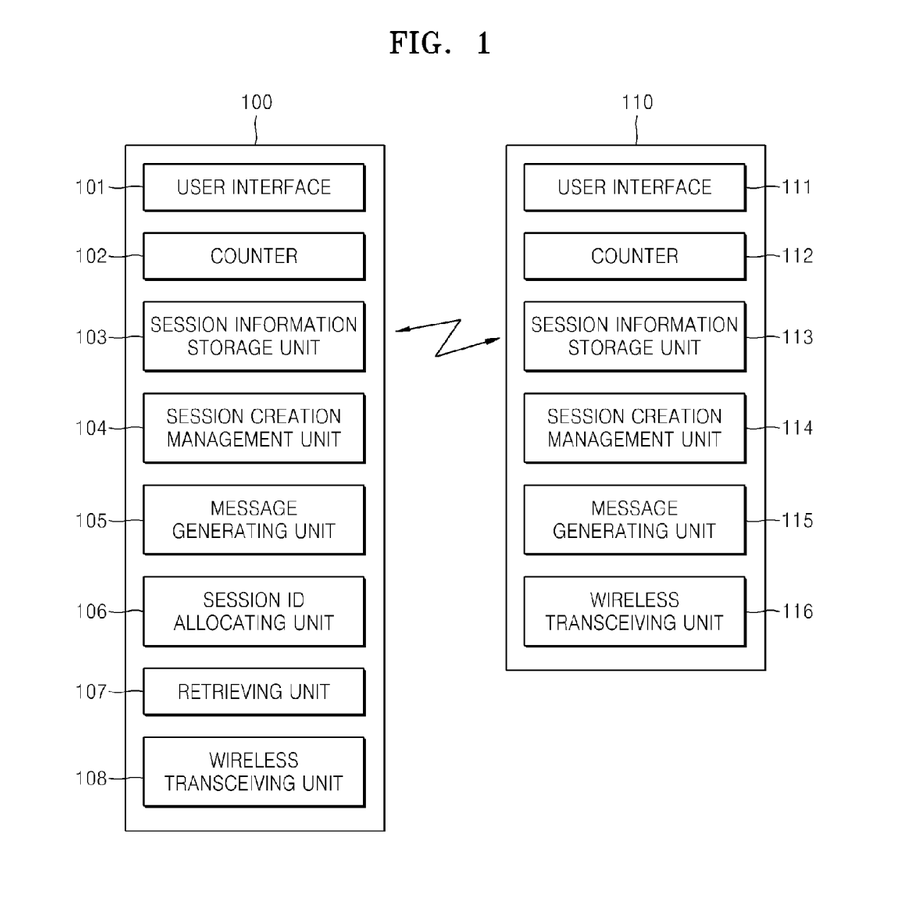
FIG. 1 is a block diagram illustrating a wireless universal serial bus (USB) host and a wireless USB device according to an example embodiment of the present invention.

FIG. 1 is a block diagram of a wireless USB host 100 and a wireless USB device 110 according to an example embodiment of the present invention. The wireless USB host 100 includes a user interface 101, a counter 102, a session information storage unit 103, a session creation management unit 104, a message generating unit 105, a session identification (ID) allocating unit 106, a retrieving unit 107, and a wireless transceiving unit 108. The wireless USB device 110 includes a user interface 111, a counter 112, a session information storage unit 113, a session creation management unit 114, a message generating unit 115, and a wireless transceiving unit 116.

Referring to FIG. 1, the user interface 101 of the wireless USB host 100 displays characteristic information on one or more wireless USB devices 110 connected through at least one wireless network. Thereafter, the user interface 101 receives a selection signal (from a user, for example) to select a wireless USB device 110 in order to create a session therewith. The wireless network may be one or more of a wireless ad hoc network (such as a mobile ad hoc network (MANET)), a wireless mesh network, and the like. The characteristic information may include a type, a performance, or a wireless Internet Protocol (IP) address of the wireless USB device 110. A session may refer to a USB over mobile ad hoc network (UOM) session.

The counter 102 manages a session created with the wireless USB device 110 and counts the number of reception failures of session status messages received from the wireless USB device 110. The counted number of reception failures is used to renew a session status of the wireless USB device 110.

Figure 10:
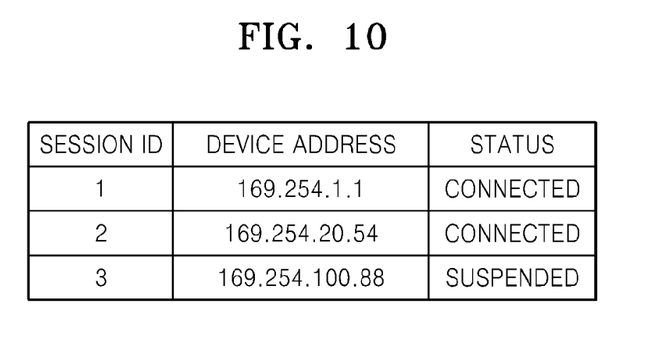
FIG. 10 is a view illustrating session information stored in a wireless USB host according to an example embodiment of the present invention.

The session information storage unit 103 stores session information on the wireless USB device 110. The session information on the wireless USB device 110 may include one or more of a session ID, a wireless IP address of the wireless USB device 110, a session status, and the like. FIG. 10 illustrates a structure of session information on the wireless USB device 110 according to an example embodiment of the present invention.

The session creation management unit 104 creates and manages the session with the wireless USB device 110. The wireless USB host 100 or the wireless USB device 110 may create the session. Accordingly, the session creation management 104 creates the session when the wireless USB device 110 does not create the session.

When the wireless USB host 100 creates the session, the message generating unit 105 generates a session creation request message requesting a creation of a session and a session creation acknowledgement message including a session ID allocated to the wireless USB device 110. The session creation request message and/or the session creation acknowledgement message may include characteristic information including an IP address of the wireless USB host 100. The generated session creation request message is transmitted to the wireless USB device 110 through the wireless transceiving unit 108.

When the wireless USB device 110 creates the session, the message generating unit 105 generates a session creation response message as a message about characteristic information including the IP address of the wireless USB host 100. The generated session creation response message is transmitted to the wireless USB device 110 through the wireless transceiving unit 108. The session creation response message may include a TRUE value permitting the creation of the session or a FALSE value not permitting the creation of the session. In addition, after the session with the wireless USB device 110 is created, a session status message is generated and periodically transmitted by the wireless transceiving unit 108 to the wireless USB device 110. The session status message indicates that the session is active.

The session ID allocating unit 106 allocates a session ID to the wireless USB device 110. The session ID allocating unit 106 may allocate the session ID when the session creation response message from the wireless USB device 110 is received. Specifically, the session ID allocating unit 106 may determine whether the session ID that is to be allocated to the wireless USB device 110 already exists in the session information storage unit 103. If the session ID that is to be allocated already exists, the session ID allocating unit 103 may use the session ID that is already stored in the session information storage unit 103.

The retrieving unit 107 retrieves one or more wireless USB devices 110 connected to the wireless network in the session creation operations performed by the wireless USB host 100 and acquires the characteristic information (including the IP address) of the retrieved wireless USB device 110. The acquired characteristic information is displayed on the user interface 101 in order to be used to select a wireless USB device 110.

The wireless transceiving unit 108 transmits and receives messages to and from the wireless USB device 110.

The user interface 111 of the wireless USB device 110 displays characteristic information on one or more wireless USB hosts 100 connected through the wireless network and receives a selection signal (from a user, for example) to select the wireless USB host 100 in order to create a session. The wireless USB device 110 may create a session with a single wireless USB host 110. The characteristic information on the wireless USB host 100 may include a type, a performance, or a wireless IP address of the wireless USB host 100.

The counter 112 manages a session created with the wireless USB host 100 and counts the number of reception failures of session status messages received from the wireless USB host 100. The counted number of reception failures is used to renew the session status of the wireless USB device 100.

The session information storage unit 113 stores session information on the wireless USB host 100. The session information may include one or more of a wireless IP address of the wireless USB host 100, a session status, and the like. Unlike the session information stored in the session information storage unit 103 of the wireless USB host 100 according to aspects of the present invention, the session information stored in the session information storage unit 113 may not include the session ID.

The session creation management unit 114 creates and generates the session with the wireless USB host 100. The wireless USB host 100 or the wireless USB device 110 may create the session. Accordingly, the session creation management unit 114 creates the session when the wireless USB host 100 does not create the session.

When the wireless USB device 110 creates the session, the message generating unit 115 generates a session creation request message requesting the creation of the session as a message about characteristic information including the IP address of the wireless USB device 110. The generated session creation request message is transmitted through the wireless transceiving unit 116. When the wireless USB host 100 creates the session, the message generating unit 115 generates a session creation response message in response to the session creation request message of the wireless USB host 100. The generated session creation response message is transmitted to the wireless USB host 100 through the wireless transceiving unit 116. In addition, after the session with the wireless USB host 100 is created, a session status message, indicating that the session is active, is generated. The generated session status message is periodically transmitted to the wireless USB host 100 through the wireless transceiving unit 116.

The wireless transceiving unit 116 transmits and receives messages to and from the wireless USB host 100.

Figure 2:
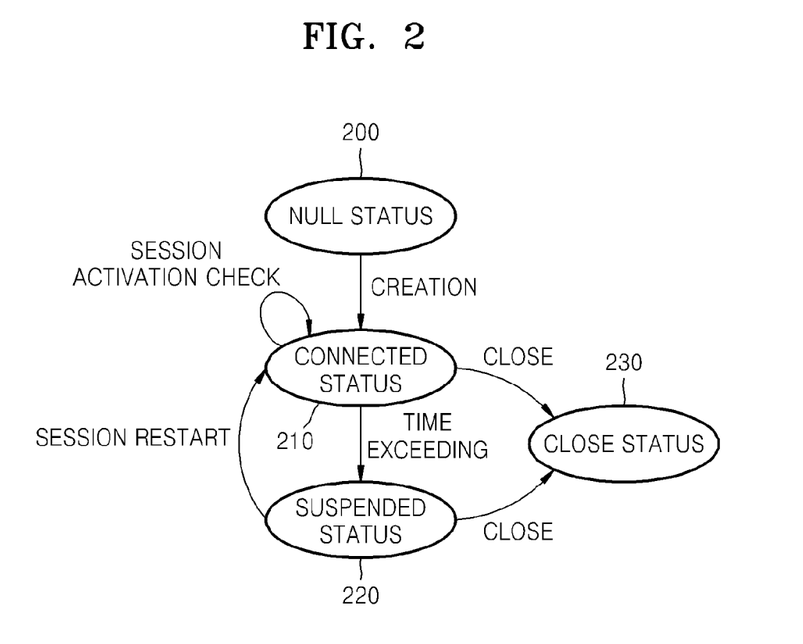
FIG. 2 is a session status transition diagram according to an example embodiment of the present invention.

FIG. 2 is a session status transition diagram according to an example embodiment of the present invention. The session status includes a null status 200, a connected status 210, a suspended status 220, and a closed status 230.

Referring to FIG. 2, if a session between the wireless USB host 100 and the wireless USB device 110 is created during the initial null status 200, the null status 200 is changed to the connected status 210.

When in the connected status 210, it is determined whether the session status message periodically transmitted from the wireless USB device 110 and/or the wireless USB host 100 is received in order to check that the session is active. If a number of reception failures of session status messages is greater than a reference number, the connected status 210 is changed to the suspended status 220. Alternatively, if a session status message is not received for a predetermined amount of time, the connected status 210 is changed to the suspended status 220. Furthermore, if a session close message informing that the session is to be closed is externally received while in the connected status 210 or the suspended status 220, the session is forcibly closed and the connected status 210 or the suspended status 220 is changed to the closed status 230. When the session is closed, the session information is deleted.

In the suspended status 220, the number of reception failures of session status messages is also counted. Accordingly, if the number of reception failures of the session status messages while in the suspended status 220 is more than the reference number of reception failures in the suspended status 220, the suspended status 220 is changed to the closed status 230. However, it is understood that according to other aspects, the suspended status 220 may only be changed to the closed status 230 when a session close message is received, or the suspended status 220 may be changed to the closed status 230 according to other methods (such as after a predetermined period of time irrespective of a number of reception failures of session status messages). When the session status message is received in the suspended status 220, the suspended status 220 is changed back to the connected status 210.

The session status transition diagram in FIG. 2 may apply to both of the wireless USB host 100 and the wireless USB device 110 or may apply to one of the wireless USB host 100 and the wireless USB device 110.

Figure 3:
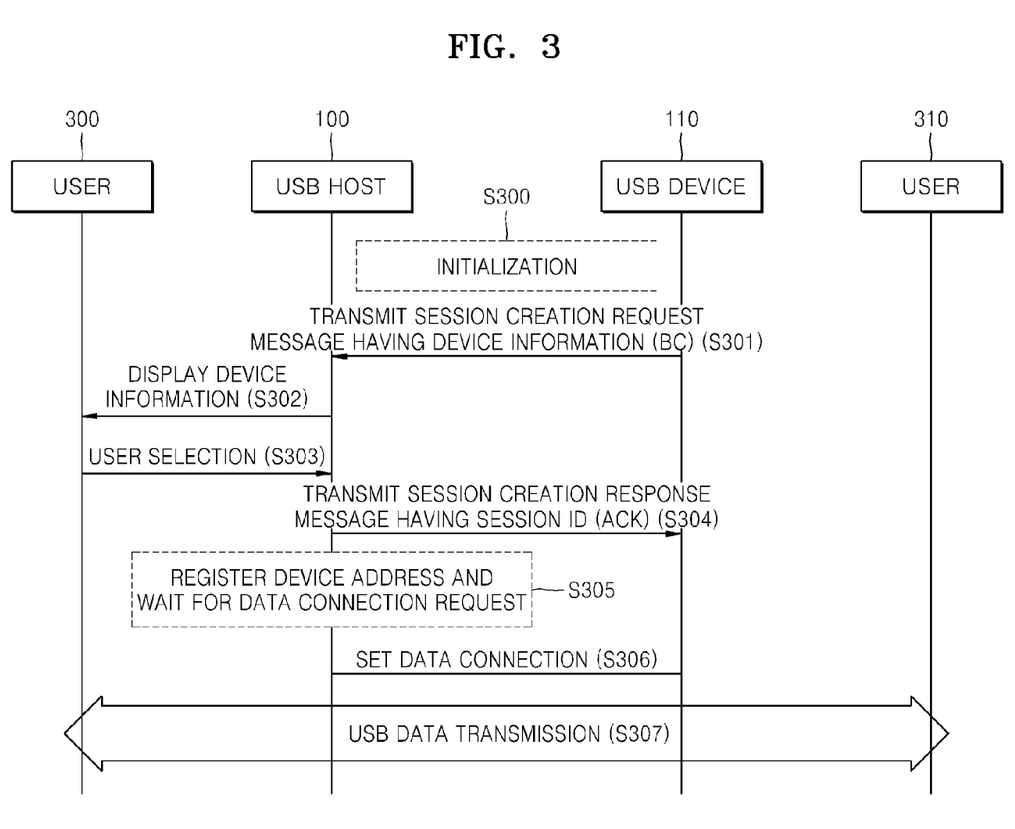
FIG. 3 is a flowchart of a session creation operation performed by a device according to an example embodiment of the present invention.

FIG. 3 is a flowchart of a session creation operation performed by the wireless USB device 110 according to an example embodiment of the present invention. When the wireless USB device 110 creates the session, the wireless USB device 110 transmits the session creation request message. When the wireless USB host 100 creates the session, the wireless USB host 100 transmits the session creation request message.

Referring to FIG. 3, in operation S300, an initialization is performed such that the wireless USB host 100 and a channel are set, and the wireless USB host 100 and the wireless USB device 110 set their wireless IP addresses, respectively.

In operation S301, the wireless USB device 110 generates a session creation request message having characteristic information including the wireless IP address of the wireless USB device 110, and broadcasts (i.e., transmits) the generated session creation request message to the wireless USB host 100. In FIG. 3, Broadcasting is abbreviated as BC.

In operation S302, the characteristic information on the wireless USB device 110 is displayed to a user 300. In operation S303, the user 300 selects the wireless USB device 110 in order to set the session. When a plurality of the wireless USB devices are used, the user 300 may select the wireless USB device 110 device from among the plurality of wireless USB devices in order to set the session.

Thereafter, in operation S304, the wireless USB host 100 allocates a session ID to the selected wireless USB device 110 and generates a session creation response message including the allocated session ID and the wireless IP address of the USB host 100. The generated session creation response message is transmitted to the wireless USB device 110 in order to create the session with the wireless USB host 100. The session may be a UOM session.

In operation S305, the wireless USB host 100 registers the wireless IP address of the wireless USB device 110, and waits for a data connection request from the wireless USB device 110.

Thereafter, in operation S306, if the data connection is requested from the wireless USB device 110, the data connection between the wireless USB host 100 and the wireless USB device 110 is set.

In operation S307, USB data transmission between the wireless USB host 100 and the wireless USB device 110 is performed.

According to aspects of the present invention, the creation of the session operation may further include an operation of periodically transmitting a session status message indicating to the wireless USB host 100 or the wireless USB device 100 that the session is active.

Figure 4:
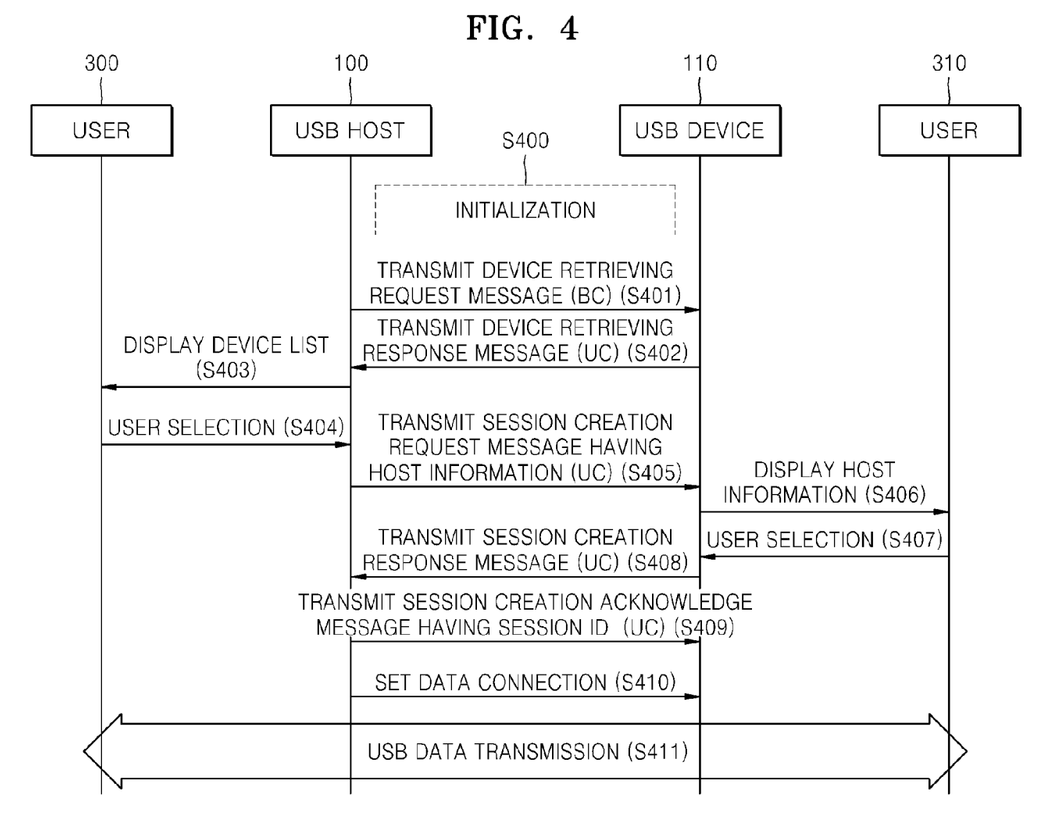
FIG. 4 is a flowchart of a session creation operation performed by a host according to another example embodiment of the present invention.

FIG. 4 is a flowchart of a creation of the session operation performed by the wireless USB host 100 according to another example embodiment of the present invention. In FIG. 4, Broadcasting is abbreviated as BC and Unicasting is abbreviated as UC.

Referring to FIG. 4, in operation S400, an initialization is performed such that the wireless USB host 100 and a channel are set, and the wireless USB host 100 and the wireless USB device 110 set their wireless IP addresses, respectively.

In operation S401, the wireless USB host 100 broadcasts a device retrieving request message to retrieve wireless USB devices 110 connected to the wireless network.

In operation S402, the wireless USB device 110 that receives the device retrieving request message transmits a device retrieving response message including characteristic information of the wireless USB device 110 to the wireless USB host 100.

In operation S403, the characteristic information of the wireless USB device 110 is displayed to the user 300. If a plurality of wireless USB devices transmit a device retrieving response message (operation S402), then the characteristic information of each of the plurality of wireless USB device is displayed to the user 300.

In operation S404, the user 300 selects a wireless USB device 110 to set a session. If a plurality of the wireless USB devices transmits a device retrieving response message, the user 300 may select the wireless USB device 110 from among the plurality of wireless USB device to set the session.

In operation S405, the wireless USB host 100 generates a session creation request message requesting a creation of the session as a message about characteristic information including the wireless IP address of the wireless USB host 100. Then, in operation S405, the generated session creation message is transmitted to the wireless USB device 110.

In operation S406, the wireless USB device 110 displays the characteristic information on the wireless USB host 100. In operation S407, the wireless USB host 100 may be selected by a selection of the user 310. It is understood that operation S406 and operation S407 are optional.

In operation S408, the wireless USB device 110 that receives the session creation request message generates a session creation response message in response to the received session creation request and transmits the generated session creation response to the wireless USB host 100.

In operation S409, the wireless USB host 100 that receives the session creation response message allocates a session ID to the wireless USB device 110 and generates a session creation acknowledgement message including the allocated session ID. The generated session creation acknowledgement message is transmitted to the wireless USB device 110 in order to create a session with the wireless USB host 100. The session may be a UOM session.

In operation S410, apart from the creation of the session, a data connection with the wireless USB device 110 is set. Thereafter, in operation S411, USB data transmission between the wireless USB host 100 and the wireless USB device 110 is performed.

According to aspects of the present invention, the creation of the session operation may further include an operation of periodically transmitting a session status message indicating to the wireless USB host 100 or the wireless USB device 110 that the session is active. In addition, an operation of storing the session information may also be further included.

Figure 5:
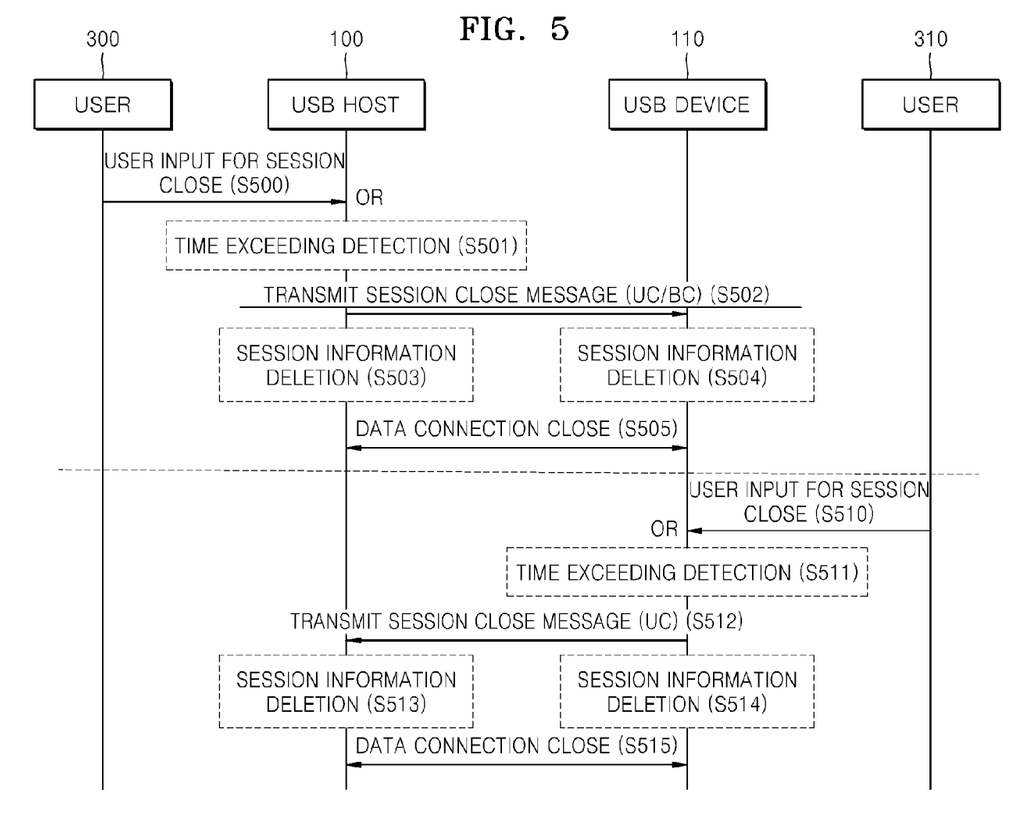
FIG. 5 is a flowchart of a session close operation according to an example embodiment of the present invention.

FIG. 5 is a flowchart of a session close operation according to an example embodiment of the present invention. The session close operation may be performed in a case where a session close message is received from the user 300 or a session status message is not received for a predetermined time that has been exceeded.

Referring to FIG. 5, in operations S500 to S505, the session close operation is performed by the wireless USB host 100. First, if the session close message instructing to close a created session is received from the user 300 in operation S500, or the session status message is detected as not received for a predetermined amount of time that has been exceeded in operation S501, the session is closed.

In operation S502, the wireless USB host 100 may transmit the session close message to the wireless USB device 110. Otherwise, in operations S503 and S504, the wireless USB host 100 and the wireless USB device 110 may delete the session information. Thereafter, in operation S505, additional operations are performed to close the data connection.

In operations S510 to S515, the session close operation is performed by the wireless USB device 110. First, if a session close message instructing to close the created session is received from the user 310 in operation S510, or the session status message is detected as not received for a predetermined amount of time that has been exceeded in operation S511, the session is closed.

In operation S512, the wireless USB device 110 may transmit the session close message to the wireless USB host 100. Otherwise, in operations S513 and S514, the wireless USB host 100 and the wireless USB device 110 may delete the session information. Thereafter, in operation S515, additional operations are performed to close the data connection.

Figure 6:
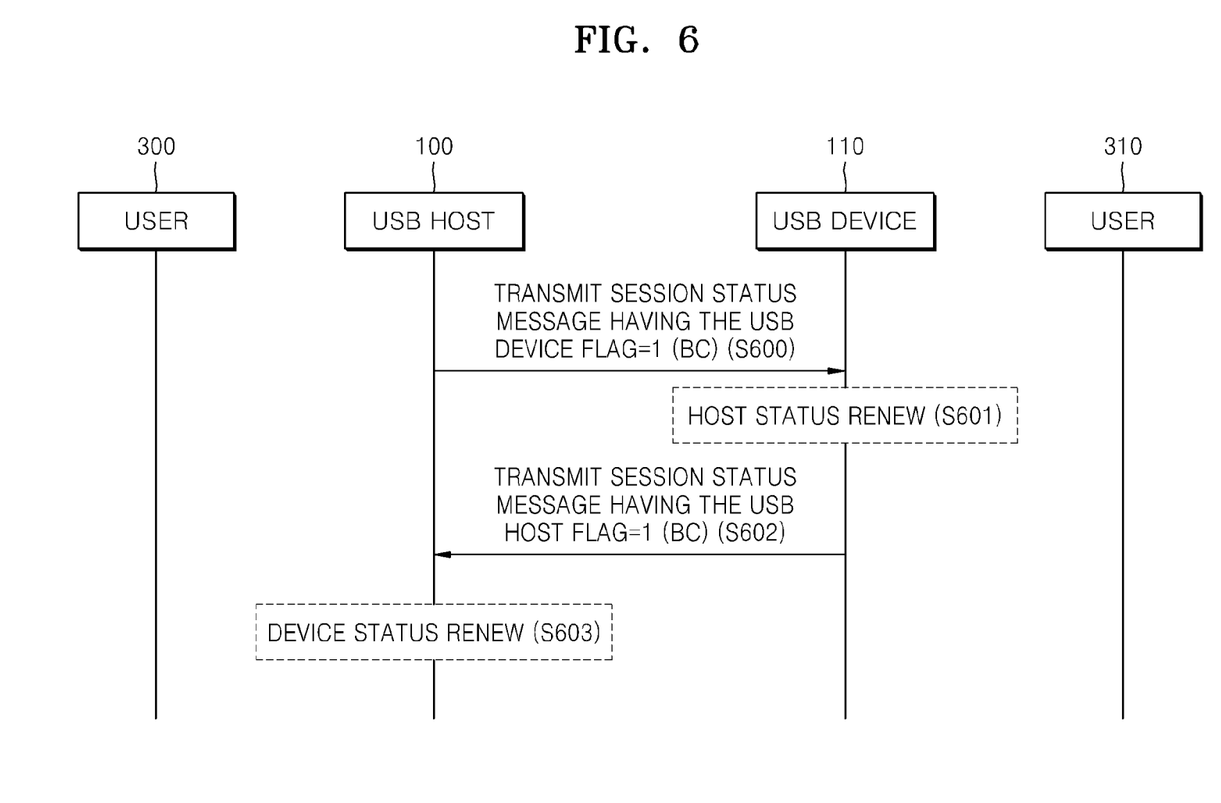
FIG. 6 is a flowchart of a session maintenance operation according to an example embodiment of the present invention.
Figure 7:
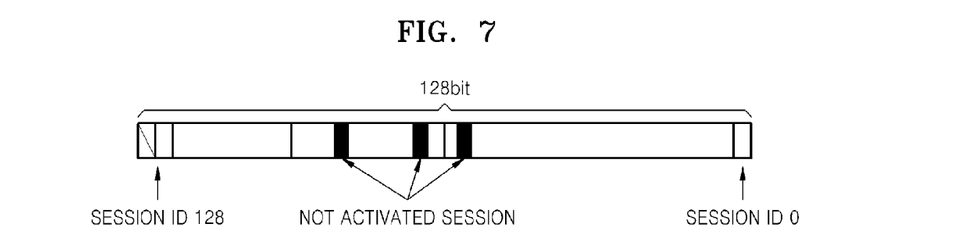
FIG. 7 is a view illustrating a session status bitmap included in a session status message according to an example embodiment of the present invention.

FIG. 6 is a flowchart of a session maintenance operation according to an example embodiment of the present invention. FIG. 7 is a view of a session status bitmap included in a session status message according to an example embodiment of the present invention.

Referring to FIG. 6, in operation S600, the wireless USB host 100 periodically transmits a session status message after a creation of a session. The session status message transmitted from the wireless USB host 100 includes a session status bitmap as shown in FIG. 7.

Referring to FIG. 7, the session status bitmap according to an example embodiment of the present invention has 128 bits. This value is determined in consideration of a specification of the USB connection. Therefore, a maximum of 128 wireless USB devices may be connected to the wireless USB host 100. Each bit represents a session activation status of the wireless USB device corresponding to the allocated session ID such that the session activation status of the wireless USB device can be "1" or "0."

Referring to FIG. 6, in operation S601, the wireless USB device 110 that receives the session status message from the wireless USB host 100 renews the session status of the wireless USB host 100 from the session information in the session information storage unit 113 (illustrated in FIG. 1).

In operations S602 and S603, the wireless USB host 100 that receives the session status message from the wireless USB device 110 renews the session status of the device in the session information stored in the session information storage unit 103 (illustrated in FIG. 1). Due to characteristics of the performance of the USB connection, a plurality of wireless USB devices may be connected to a single wireless USB host, however, a single wireless USB device can only be connected to a single wireless USB host. Therefore, the session status bitmap of the wireless USB device 110 only has 1-bit (unlike the session status bitmap shown in FIG. 7).

Figure 8:
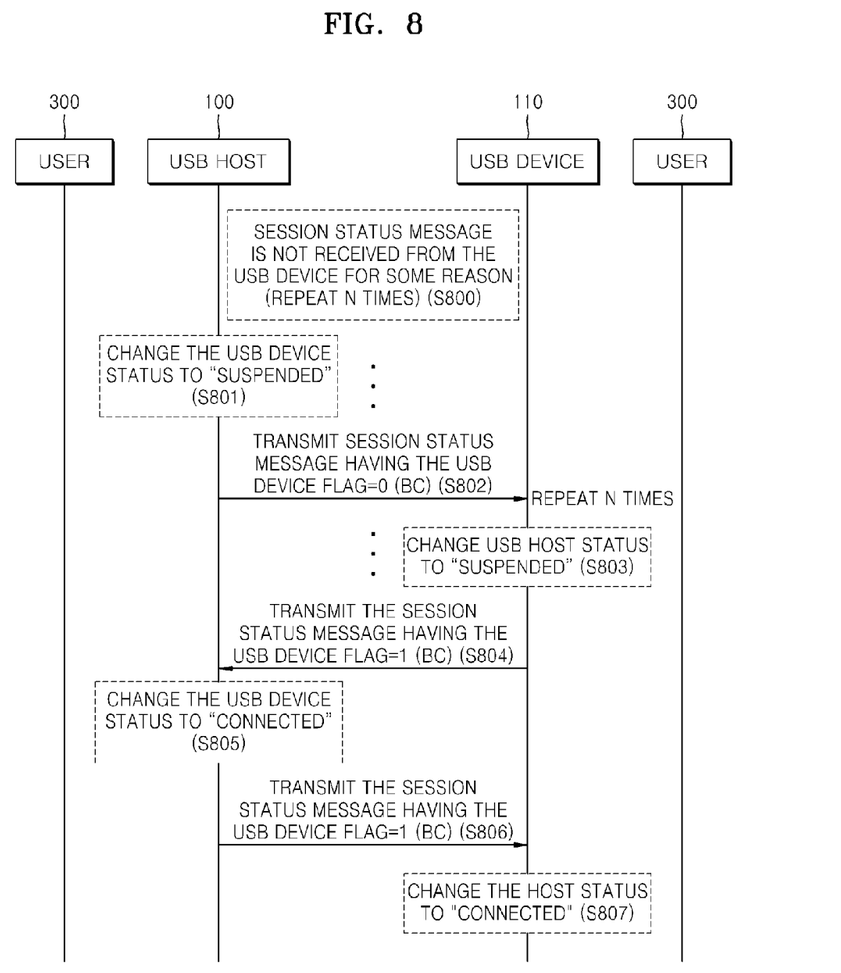
FIG. 8 is a flowchart of session stop and restart operations according to an example embodiment of the present invention.

FIG. 8 is a flowchart of session stop and restart operations according to an example embodiment of the present invention. Referring to FIG. 8, in operations S800 to S803, the session status message is not received and the status of the session is suspended.

After the creation of the session, the wireless USB device 110 periodically transmits the session status message to the wireless USB host 100. In operation S800, the wireless USB host 100 counts the number of reception failures of the session status messages and determines whether the number of reception failures counted for a predetermined time is greater than a reference number.

In operation S801, when the number of reception failures of the session status message is greater than the reference number, the wireless USB host 100 changes the session status of the wireless USB device 110 from a connected status to a suspended status.

Similarly, after the creation of the session, the wireless USB host 100 periodically transmits the session status message to the wireless USB device 110. It is assumed that in operation S802, the session status message is not received, or the session status message is received but a bit corresponding to a session ID from among the bits of the session activation bitmap included in the received session status message is "0."

In operation S803, it is determined whether operation S802 is repeatedly performed more than N times. According to a result of the determination, if operation S802 has been performed more than N times, the wireless USB device 110 changes the session status of the wireless USB host 100 in the session information stored in the session information storage unit 113 (illustrated in FIG. 1) from the connected status to the suspended status.

In operations S804 to S807, the wireless USB host 100 or the wireless USB device 110 receives the session status message in the suspended status, so that the session status is renewed.

It is assumed that in operation S804, the current session status is the suspended status, and the wireless USB host 100 receives a session status message in which the session status of the session status bitmap is "1." In operation S805, the wireless USB host 100 changes the session status of the wireless USB device 110 from the suspended status to the connected status.

It is assumed that in operation S806, the current session status is the suspended status, and the wireless USB device 110 receives a session status message in which the session status of the session status bitmap is "1." In operation S807, the wireless USB device 110 changes the session status of the wireless USB host 100 from the suspended status to the connected status.

Figure 9:
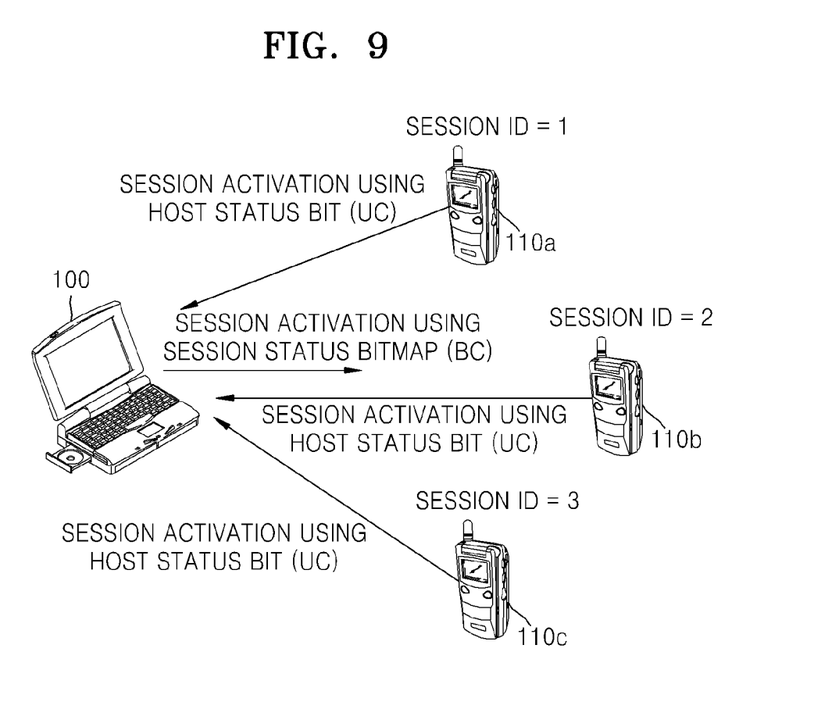
FIG. 9 is a view illustrating a wireless USB host and a plurality of USB devices according to an example embodiment of the present invention.

FIG. 9 is a view of a wireless USB host 100 and a plurality of wireless USB devices 110*a*, 110*b*, and 110*c* according to an example embodiment of the present invention. FIG. 10 is a view of session information stored in the wireless USB host 100 in FIG. 9, according to an example embodiment of the present invention.

Referring to FIG. 9, session IDs 1, 2, and 3 are allocated to the wireless USB devices 110*a*, 110*b*, and 110*c*, respectively. The wireless USB host 100 transmits the session status message including the session status bitmap shown in FIG. 7, and the USB devices 110*a*, 110*b*, and 110*c* transmit session status messages having a host status bit of 1-bit, so that the session activation status can be informed.

FIG. 10 illustrates the session information stored in the wireless USB host 100 including session IDs, wireless IP addresses of the wireless USB devices, and session statuses, according to an example embodiment of the present invention. The wireless USB device 110 may store similar information. However, the wireless USB device 110 creates a session with a single wireless USB host 100. Accordingly, the wireless USB device 110 includes the IP address of the wireless USB host 100 and the session status, but does not include a session ID.

As described above, according to aspects of the present invention, the creating and managing of a session can be performed by the wireless USB host. As a result, a battery consumption of the wireless USB device and an inconvenience to a user due to frequent loss of connections decrease. In addition, the creating and managing of the session can be symmetrically performed by the wireless USB host and the wireless USB device, so that various usage scenarios can be created according to type and characteristics of the wireless USB device. In addition, IP-based technology is used, so that aspects of the present invention can be applied to any network technology and also to a personal area network (PAN) region and a wireless local area network (WLAN) region.

Various components of the apparatus as shown in FIG. 1, such as the session creation management unit 104 and the message generating unit 105, can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. Software modules can be written via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, if a session status message is not received for a predetermined amount of time (as opposed to if a number of received reception failures is greater than a reference number), the connected status is changed to the suspended status. Also, the suspended status may only be changed to the closed status when a session close message is received (as opposed to changing the suspended status to a closed status if a number of received reception failures during the suspended status is greater than a predetermined number), or the suspended status may be changed to the closed status according to other methods (such as after a predetermined period of time irrespective of a number of reception failures of session status messages). Accordingly, it is intended, therefore, that the present invention not be limited to the various example embodiments disclosed, but that the present invention includes all embodiments falling within the scope of the appended claims.

What is claimed is:

1. A session management method of managing a session created between a wireless Universal Serial Bus (USB) host and a wireless USB device through a wireless network, the session management method comprising:
   receiving session status messages periodically to check a status of the created session, wherein the session status messages indicate whether the created session is active;
   changing a current status of the created session from a connected status to a suspended status if the current status of the created session is the connected status when a number of continuous reception failures corresponding to a number of the session status messages that are not received reaches a first reference number; and
   terminating the created session if the current status of the created session is the suspended status when the number of the continuous reception failures reaches a second reference number,
   wherein the created session is a wireless USB session;
   wherein the session status messages are received periodically to check the status during the entire created session; and
   wherein the suspended status allows a session to be restarted without creating a new session.

2. The session management method as claimed in claim 1, further comprising terminating the created session when a session close message including an instruction to close the created session is received.

3. The session management method as claimed in claim 1, further comprising changing the current status of the created session from the suspended status to the connected status when one of the session status messages is received while the current status of the created session is the suspended status.

4. The session management method as claimed in claim 1, further comprising deleting session information about the created session when the created session is closed.

5. The session management method as claimed in claim 4, wherein the session information comprises a session identification (ID), or an Internet Protocol (IP) address, or the current status of the created session, or any combination thereof.

6. The session management method as claimed in claim 1, further comprising transmitting a session close message including an instruction to close the created session when the created session is desired to be closed.

7. The session management method as claimed in claim 1, wherein the wireless network is a mobile ad hoc network.

8. The session management method as claimed in claim 1, wherein the USB device receives the session status messages, changes the current status, and closes the created session.

9. The session management method as claimed in claim 1, wherein the USB host receives the session status messages, changes the current status, and closes the created session.

10. The session management method as claimed in claim 1, wherein the first reference number is N and the second reference number is 2N.

11. A non-transitory computer-readable recording medium encoded with instructions for controlling a computer to perform the method of claim 1.

12. The session management method as claimed in claim 1, wherein each of the session status messages comprises session status information indicating whether the created session is active.

13. The session management method as claimed in claim 1, wherein each of the session status messages comprises a session status bitmap comprising a bit indicating whether the created session is active.

14. The session management method as claimed in claim 1, wherein the session status messages are periodically transmitted after the session is created.

15. The session management method as claimed in claim 1, wherein the session status messages that are not received when the current status of the created session is the connected status indicate that the created session is active; and
   the session status messages that are not received when the current status of the created session is the suspended status indicate that the created session is inactive.

16. The session management method as claimed in claim 1, wherein the status of the created session is checked when the created session is active.

17. A wireless USB host for managing a session created with a wireless USB device through a wireless network, the wireless USB host comprising:
   a message generating unit to generate a session status message for checking a status of the created session, wherein the session status message generated by the message generating unit indicates whether the created session is active;
   a wireless transceiving unit to periodically transmit the generated session status message to the wireless USB device through the wireless network and to receive a session status message from the wireless USB device through the wireless network, wherein the session status message received from the wireless USB device indicates whether the created session is active;
   a counter to count a number of continuous reception failures corresponding to a number of the session status messages that are not received from the wireless USB device; and
   a session creation management unit to change a current status of the created session from a connected status to a suspended status if the current status of the created session is the connected status when the number of the continuous reception failures reaches a first reference number, and to terminate the created session if the current status is the suspended status when the number of the continuous reception failures reaches a second reference number,
   wherein the generated session status message is periodically transmitted to check the status during the entire created session; and
   wherein the suspended status allows a session to be restarted without creating a new session.

18. The wireless USB host as claimed in claim 17, further comprising a session information storage unit to store session information including the status of the created session.

19. The wireless USB host as claimed in claim 17, wherein the session creation management unit terminates the created session when a session close message including an instruction to terminate the created session is received.

20. The wireless USB host as claimed in claim 17, wherein the session creation management unit changes the current status of the created session to the connected status when one of session status messages is received while the current status of the created session is the suspended status.

21. The wireless USB host of claim 18, wherein the session creation management unit deletes the session information on the created session when the created session is terminated.

22. The wireless USB host as claimed in claim 18, wherein the session information comprises a session identification (ID), or an Internet Protocol (IP) address, or the current status of the created session, or any combination thereof.

23. The wireless USB host as claimed in claim 17, wherein the session creation management unit transmits a session close message including an instruction to terminate the created session when the created session is desired to be terminated.

24. The wireless USB host as claimed in claim 17, wherein the wireless network is a mobile ad hoc network.

25. The wireless USB host as claimed in claim 17, wherein the first reference number is N and the second reference number is 2N.

26. The wireless USB host as claimed in claim 17, wherein each of the session status messages comprises session status information indicating whether the created session is active.

27. The wireless USB host as claimed in claim 17, wherein each of the session status messages comprises a session status bitmap comprising a bit indicating whether the created session is active.

28. The wireless USB host as claimed in claim 17, wherein the session status messages are periodically transmitted after the session is created.

29. The wireless USB host as claimed in claim 17, wherein the session status messages that are not received when the current status of the created session is the connected status indicate that the created session is active; and the session status messages that are not received when the current status of the created session is the suspended status indicate that the created session is inactive.

30. A wireless USB device for managing a session created with a wireless USB host through a wireless network, the wireless USB device comprising:

a wireless transceiving unit to receive through the wireless network a session status message, periodically transmitted from the wireless USB host through the wireless network, indicating a status of the created session, wherein the session status message indicates whether the created session is active;

a counter to count a number of continuous reception failures corresponding to a number of the session status messages that are not received from the wireless USB host; and a session creation management unit to change a current status of the created session from a connected status to a suspended status if the current status of the created session is the connected status when the number of the continuous reception failures is greater than a first reference number, and to close the created session if the current status is the suspended status when the number of the continuous reception failures is greater than a second reference number, wherein the session status message is periodically transmitted to indicate the status during the entire created session; and wherein the suspended status allows a session to be restarted without creating a new session.

31. The wireless USB device as claimed in claim 30, wherein each of the session status messages comprises session status information indicating whether the created session is active.

32. The wireless USB device as claimed in claim 30, wherein each of the session status messages comprises a session status bitmap comprising a bit indicating whether the created session is active.

33. The wireless USB device as claimed in claim 30, wherein the session status messages are periodically transmitted after the session is created.

34. The wireless USB device as claimed in claim 30, wherein the session status messages that are not received when the current status of the created session is the connected status indicate that the created session is active; and the session status messages that are not received when the current status of the created session is the suspended status indicate that the created session is inactive.

35. A wireless USB host for managing a session created with a wireless USB device through a wireless network, the wireless USB host comprising:

a wireless transceiving unit to receive through the wireless network a session status message, periodically transmitted from the wireless USB device through the wireless network, indicating a status of the created session, wherein the session status message indicates whether the created session is active;

a counter to count a number of continuous reception failures corresponding to a number of the session status messages that are not received from the wireless USB device; and a session creation management unit to change a current status of the created session from a connected status to a suspended status if the current status of the created session is the connected status when the number of the continuous reception failures reaches a first reference number, and to close the created session if the current status is the suspended status when the number of the continuous reception failures reaches a second reference number, wherein the session status message is periodically transmitted to indicate the status during the entire created session; and wherein the suspended status allows a session to be restarted without creating a new session.

36. The wireless USB host as claimed in claim 35, wherein each of the session status messages comprises session status information indicating whether the created session is active.

37. The wireless USB host as claimed in claim 35, wherein each of the session status messages comprises a session status bitmap comprising a bit indicating whether the created session is active.

38. The wireless USB host as claimed in claim 35, wherein the session status messages are periodically transmitted after the session is created.

39. The wireless USB host as claimed in claim 35, wherein the session status messages that are not received when the current status of the created session is the connected status indicate that the created session is active; and the session status messages that are not received when the current status of the created session is the suspended status indicate that the created session is inactive.

* * * * *